Feb. 19, 1924.
S. REISER
1,484,560
LOCKING DEVICE FOR MOTOR VEHICLES
Filed Oct. 4, 1921
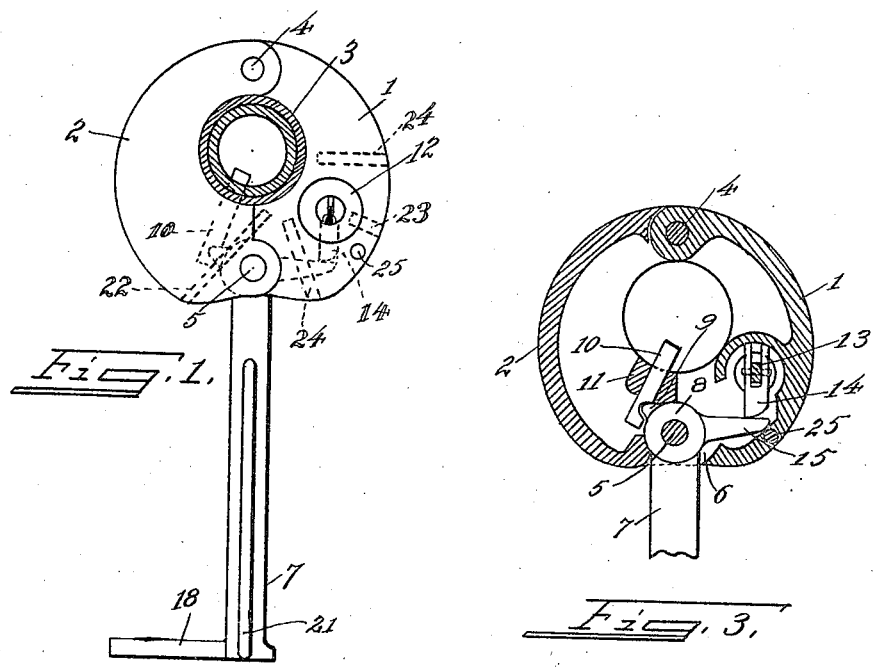
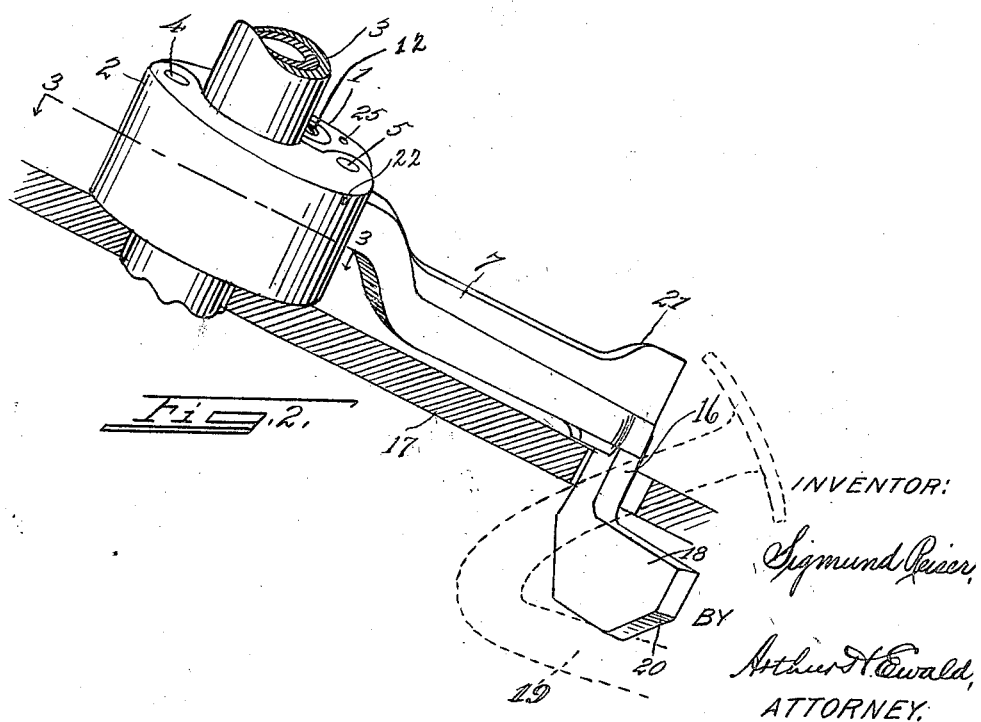
INVENTOR:
Sigmund Reiser,
BY
Arthur H. Ewald,
ATTORNEY.

Patented Feb. 19, 1924.

1,484,560

UNITED STATES PATENT OFFICE.

SIGMUND REISER, OF CINCINNATI, OHIO.

LOCKING DEVICE FOR MOTOR VEHICLES.

Application filed October 4, 1921. Serial No. 505,223.

*To all whom it may concern:*

Be it known that I, SIGMUND REISER, a citizen of the United States, and resident of Cincinnati, in the county of Hamilton and State of Ohio, have invented certain new and useful Improvements in Locking Devices for Motor Vehicles, of which the following is a full, clear, and exact description, reference being had to the accompanying drawing, forming a part of this specification.

My invention relates to locking devices for motor vehicles and has particular reference to the provision of means for locking the steering column and clutch pedal of such a vehicle.

The principal object of this invention is to provide a simple and practically impregnable lock for the steering column and clutch pedal of a vehicle of the kind mentioned.

Further objects of the invention will appear from the following detailed description thereof.

In the drawings:

Figure 1 is a plan view of the invention attached to the steering column of a motor vehicle, said column being shown in section;

Figure 2 is a perspective of the invention;

Figure 3 is a section on line 3—3 of Figure 2.

The numerals 1 and 2 indicate respectively the two sections of a housing which is arranged, when assembled to fit around the steering column 3 of a motor vehicle. The housing sections 1 and 2 are pivotally secured together by means of a hardened steel pin 4, and when the sections are applied to the steering column, the free ends of the housing sections are secured together by means of a similar hardened steel pin 5. The pins 4 and 5 fit tightly in the sections so that they may be removed only with extreme difficulty.

The housing formed of the sections 1 and 2 is provided at one side with an opening 6 for an arm 7, the head 8 of which is pivotally mounted on the pin 5. The head 8 is provided with a projection 9 which engages in a depression in a hardened steel pin, 10, said pin being slidably mounted in a part 11 of the housing.

Mounted in the housing section 1 is a key operated lock 12 having a rotatable element 13 operated by means of the lock key and controlled by the usual dogs, etc. (not shown) entering into the construction of the particular type of lock selected. On the inner end of the element 13 is a detent 14, rotated by said element into and out of the path of travel of a finger 15 on the head 8 of arm 7 when said arm is rotated on the pin 5. The outer end of the arm 7 is provided with a depending portion 16 adapted to extend downwardly through a slot in the floor 17 of the vehicle. The free end of the portion 16 is provided with a head 18, arranged when the arm 7 is rotated about the pin 5 to one of its extreme positions to be interposed above the clutch pedal arm 19, so as to hold the same depressed, that is with the clutch members out of engagement. The lower edge of the head 18 is provided with a cam surface 20 automatically to depress the arm when the head is moved in the proper direction. The arm 7 is provided with a foot lug 21 above the floor for the convenient operation of said arm.

In order further to secure to housing sections against disassembling or such effective mutilation as would overcome the security desired a hardened steel pin 22 is driven into the section 2 and extends into the section 1, the said pin passing diagonally through the parts above the head 8. A short pin 23, also of hardened steel serves to secure the lock from removal from the housing. Hardened pins 24 and 25 are driven into the housing at such places and are so disposed as to prevent sawing the housing at vital points.

The steering column is provided with a recess within which the sliding pin 10 is adapted to engage to lock said column when the arm 7 is rotated to bring the head 18 in locking position.

The operation of the device will be apparent from the foregoing description. The housing sections are secured around the steering column by means of the pins 4 and 5; the column having been previously provided with a recess or keeper for the pin 10. The pin 22 is then driven diagonally into the sections. When it is desired to lock the vehicle, the arm 7 is moved to the left by the driver's foot. The head 18 engages over the clutch pedal arm 19, to hold the clutch members out of engagement. Simultaneously the rotation of arm 7 shifts the pin 10 into the recess in the steering column, securing it against rotation. With the key the operator then turns the detent 14 so that it engages the finger 15 and locks the arm 7 against return to unlocked position. In order to unlock the detent 14 must be returned by means of the operator's key. The various hardened steel pins in the housing effectually prevent its mutilation or the removal of the detent and other locking elements.

Having thus fully described my invention, what I claim as new and desire to secure by Letters Patent, is:—

1. A device of the character specified comprising a housing adapted to be secured around the steering column of a motor vehicle, an arm pivotally mounted in said housing, means in said housing operable by said arm and arranged to engage said steering column to lock the same against rotation, means for locking said arm against rotation, and means on the end of said arm arranged to engage a pedal of the vehicle to lock the same in a desired position.

2. A device of the character specified comprising a housing adapted to be secured around the steering column of a motor vehicle, a pin slidably mounted in said housing and arranged to engage in a recess in said steering column to lock the same against rotation, an arm pivotally mounted in said housing, means whereby said arm is caused upon rotation to operate said pin into and out of locking position, means for locking said arm against rotation, and means on the end of said arm arranged to engage a pedal of the vehicle to lock the same in a desired position.

3. A device of the character specified comprising a housing, said housing being composed of two sections arranged when assembled to fit around the steering column of a motor vehicle, hardened pins for securing said sections together, an arm pivotally mounted on one of said pins, means in said housing operable by said arm and arranged to engage said steering column to lock the same against rotation, means for locking said arm against rotation, and means on the end of said arm arranged to engage a pedal of the vehicle to lock the same in a desired position.

SIGMUND REISER.